US012387129B2

(12) United States Patent
Burenkov et al.

(10) Patent No.: US 12,387,129 B2
(45) Date of Patent: Aug. 12, 2025

(54) SYSTEMS AND METHODS FOR QUANTUM-ENABLED ERROR CORRECTION

(71) Applicant: University of Maryland, College Park, College Park, MD (US)

(72) Inventors: Ivan Alexandrovish Burenkov, Boyds, MD (US); Sergey Vladimirovich Polyakov, Gaithersburg, MD (US)

(73) Assignees: UNIVERSITY OF MARYLAND, COLLEGE PARK, College Park, MD (US); GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 18/541,159

(22) Filed: Dec. 15, 2023

(65) Prior Publication Data

US 2024/0202568 A1 Jun. 20, 2024

Related U.S. Application Data

(60) Provisional application No. 63/598,677, filed on Nov. 14, 2023, provisional application No. 63/432,746, filed on Dec. 15, 2022.

(51) Int. Cl.
*G06N 10/70* (2022.01)
*G06N 7/01* (2023.01)
(Continued)

(52) U.S. Cl.
CPC ............... *G06N 10/70* (2022.01); *G06N 7/01* (2023.01); *H04B 10/70* (2013.01); *H04L 1/004* (2013.01)

(58) Field of Classification Search
CPC .......... G06N 10/70; G06N 7/01; H04B 10/70; H04L 1/004
See application file for complete search history.

(56) References Cited

U.S. PATENT DOCUMENTS

| | | | |
|---|---|---|---|
| 2012/0177385 A1* | 7/2012 | Guha | H04L 27/223 398/202 |
| 2024/0332892 A1* | 10/2024 | Ono | H01S 5/02255 |

OTHER PUBLICATIONS

C. Wei, X. Zhou, L. Wang, P. Tian and L. Hanzo, "Soft Iterative Quantum Receivers Approaching the Helstrom Limit Using Realistic Quantum Devices," in IEEE Access, vol. 6, pp. 10197-10207, 2018 (Year: 2018).*

(Continued)

*Primary Examiner* — Cynthia Britt
(74) *Attorney, Agent, or Firm* — George Likourezos; Carter, DeLuca & Farrell LLP (57) ABSTRACT

A system for quantum-enabled error correction includes a receiver configured to receive an optical signal and detect photons. The optical signal includes encoded information that includes communication alphabet symbols. The receiver includes a processor and a memory that instructions stored thereon, which, when executed by the processor, cause the system to: detect photons by the receiver; determine a set of a posteriori Bayesian probability values based on a period of time of a previous state of the LO and based upon the detected photons; update the LO from the previous state to the next state based on the highest a posteriori Bayesian probability; and determine a likelihood of each of the communication alphabet symbols being correct based on the set of probability values. The next state of the LO is a new input state having a highest probability value that the next state matches the state of the optical signal.

20 Claims, 10 Drawing Sheets

(51) Int. Cl.
 *H04B 10/70* (2013.01)
 *H04L 1/00* (2006.01)

(56) References Cited

OTHER PUBLICATIONS

M.T. DiMario, et al., "Optimized communication strategies with binary coherent states over phase noise channels", Quantum Information, Nature Partners Journal, pp. 1-7, Jul. 31, 2019.

* cited by examiner

| # | PHOTONS /BIT | CODEWORD |
|---|---|---|
| 1 | 3 | $A, B, \overline{A}, \overline{B}, \overline{\overline{A}}, \overline{\overline{B}}$ |
| 2 | 3.5 | $A, B, \overline{A}, \overline{B}, \overline{\overline{A}}, \overline{\overline{B}}, A\oplus B$ |
| 3 | 4 | $A, B, C, \overline{A}, \overline{B}, \overline{C}, \overline{\overline{A}}, \overline{\overline{B}}, \overline{\overline{C}}, A\oplus B, A\oplus C, B\oplus C$ |
| 4 | 4.5 | $A, B, C, D, \overline{A}, \overline{B}, \overline{C}, \overline{D}, \overline{\overline{A}}, \overline{\overline{B}}, \overline{\overline{C}}, \overline{\overline{D}}, A\oplus B, A\oplus C, A\oplus D, B\oplus C, B\oplus D, C\oplus D$ |
| 5 | 5 | $A, B, C, D, E, \overline{A}, \overline{B}, \overline{C}, \overline{D}, \overline{E}, \overline{\overline{A}}, \overline{\overline{B}}, \overline{\overline{C}}, \overline{\overline{D}}, \overline{\overline{E}},$<br>$A\oplus B, A\oplus C, A\oplus D, A\oplus E, B\oplus C, B\oplus D, B\oplus E, C\oplus D, C\oplus E, D\oplus E$ |
| 6 | 5.5 | $A, B, \overline{A}, \overline{A}, \overline{\overline{A}}, \overline{B}, \overline{B}, \overline{\overline{B}}, A\oplus B, \overline{A\oplus B}, \overline{\overline{A\oplus B}}$ |
| 7 | 6 | $A, B, C, D, \overline{A}, \overline{B}, \overline{C}, \overline{D}, \overline{\overline{A}}, \overline{\overline{B}}, \overline{\overline{C}}, \overline{\overline{D}},$<br>$A\oplus B, A\oplus C, A\oplus D, B\oplus C, B\oplus D, C\oplus D, \overline{A\oplus B}, \overline{A\oplus C}, \overline{A\oplus D}, \overline{B\oplus C}, \overline{B\oplus D}, \overline{C\oplus D}$ |
| 8 | 6.5 | $A, B, \overline{A}, \overline{A}, \overline{B}, \overline{B}, \overline{\overline{A}}, \overline{\overline{A}}, \overline{\overline{B}}, \overline{\overline{B}}, A\oplus B, \overline{A\oplus B}, \overline{\overline{A\oplus B}}$ |
| 9 | 7 | $A, B, C, D, E, \overline{A}, \overline{B}, \overline{C}, \overline{D}, \overline{E}, \overline{\overline{A}}, \overline{\overline{B}}, \overline{\overline{C}}, \overline{\overline{D}}, \overline{\overline{E}},$<br>$A\oplus B, A\oplus C, A\oplus D, A\oplus E, B\oplus C, B\oplus D, B\oplus E, C\oplus D, C\oplus E, D\oplus E,$<br>$\overline{A\oplus B}, \overline{A\oplus C}, \overline{A\oplus D}, \overline{A\oplus E}, \overline{B\oplus C}, \overline{B\oplus D}, \overline{B\oplus E}, \overline{C\oplus D}, \overline{C\oplus E}, \overline{D\oplus E}$ |
| 10 | 7.5 | $A, B, C, D, \overline{A}, \overline{B}, \overline{C}, \overline{D}, \overline{\overline{A}}, \overline{\overline{B}}, \overline{\overline{C}}, \overline{\overline{D}}, A\oplus B, A\oplus C, A\oplus D, B\oplus C, B\oplus D, C\oplus D,$<br>$\overline{A\oplus B}, \overline{A\oplus C}, \overline{A\oplus D}, \overline{B\oplus C}, \overline{B\oplus D}, \overline{C\oplus D}, \overline{\overline{A\oplus B}}, \overline{\overline{A\oplus C}}, \overline{\overline{A\oplus D}}, \overline{\overline{B\oplus C}}, \overline{\overline{B\oplus D}}, \overline{\overline{C\oplus D}}$ |
| 11 | 8 | $A, B, C, \overline{A}, \overline{A}, \overline{B}, \overline{B}, \overline{C}, \overline{C}, \overline{\overline{A}}, \overline{\overline{A}}, \overline{\overline{B}}, \overline{\overline{B}}, \overline{\overline{C}}, \overline{\overline{C}},$<br>$A\oplus B, A\oplus C, B\oplus C, \overline{A\oplus B}, \overline{A\oplus B}, \overline{A\oplus C}, \overline{A\oplus C}, \overline{B\oplus C}, \overline{B\oplus C}$ |
| 12 | 8.5 | $A, B, C, D, \overline{A}, \overline{A}, \overline{A}, \overline{B}, \overline{B}, \overline{B}, \overline{C}, \overline{C}, \overline{C}, \overline{D}, \overline{D}, \overline{D}, A\oplus B, A\oplus C, A\oplus D, B\oplus C, B\oplus D, C\oplus D,$<br>$\overline{A\oplus B}, \overline{A\oplus B}, \overline{A\oplus C}, \overline{A\oplus C}, \overline{A\oplus D}, \overline{A\oplus D}, \overline{B\oplus C}, \overline{B\oplus C}, \overline{B\oplus D}, \overline{B\oplus D}, \overline{C\oplus D}, \overline{C\oplus D}$ |
| 13 | 9 | $A, B, C, D, E, \overline{A}, \overline{B}, \overline{C}, \overline{D}, \overline{E}, \overline{\overline{A}}, \overline{\overline{B}}, \overline{\overline{C}}, \overline{\overline{D}}, \overline{\overline{E}},$<br>$A\oplus B, A\oplus C, A\oplus D, A\oplus E, B\oplus C, B\oplus D, B\oplus E, C\oplus D, C\oplus E, D\oplus E,$<br>$\overline{A\oplus B}, \overline{A\oplus C}, \overline{A\oplus D}, \overline{A\oplus E}, \overline{B\oplus C}, \overline{B\oplus D}, \overline{B\oplus E}, \overline{C\oplus D}, \overline{C\oplus E}, \overline{D\oplus E},$<br>$\overline{\overline{A\oplus B}}, \overline{\overline{A\oplus C}}, \overline{\overline{A\oplus D}}, \overline{\overline{A\oplus E}}, \overline{\overline{B\oplus C}}, \overline{\overline{B\oplus D}}, \overline{\overline{B\oplus E}}, \overline{\overline{C\oplus D}}, \overline{\overline{C\oplus E}}, \overline{\overline{D\oplus E}}$ |
| 14 | 9.5 | $A, B, C, D, \overline{A}, \overline{A}, \overline{B}, \overline{B}, \overline{C}, \overline{C}, \overline{D}, \overline{D}, \overline{\overline{A}}, \overline{\overline{A}}, \overline{\overline{B}}, \overline{\overline{B}}, \overline{\overline{C}}, \overline{\overline{C}}, \overline{\overline{D}}, \overline{\overline{D}},$<br>$A\oplus B, A\oplus C, A\oplus D, B\oplus C, B\oplus D, C\oplus D, \overline{A\oplus B}, \overline{A\oplus C}, \overline{A\oplus D}, \overline{B\oplus C}, \overline{B\oplus D}, \overline{C\oplus D},$<br>$\overline{\overline{A\oplus B}}, \overline{\overline{A\oplus C}}, \overline{\overline{A\oplus D}}, \overline{\overline{B\oplus C}}, \overline{\overline{B\oplus D}}, \overline{\overline{C\oplus D}}$ |
| 15 | 10 | $A, B, C, D, E, \overline{A}, \overline{A}, \overline{A}, \overline{B}, \overline{B}, \overline{B}, \overline{C}, \overline{C}, \overline{C}, \overline{D}, \overline{D}, \overline{D}, \overline{E}, \overline{E}, \overline{E},$<br>$A\oplus B, A\oplus C, A\oplus D, A\oplus E, B\oplus C, B\oplus D, B\oplus E, C\oplus D, C\oplus E, D\oplus E,$<br>$\overline{A\oplus B}, \overline{A\oplus B}, \overline{A\oplus C}, \overline{A\oplus C}, \overline{A\oplus D}, \overline{A\oplus D}, \overline{A\oplus E}, \overline{A\oplus E}, \overline{B\oplus C}, \overline{B\oplus C},$<br>$\overline{B\oplus D}, \overline{B\oplus D}, \overline{B\oplus E}, \overline{B\oplus E}, \overline{C\oplus D}, \overline{C\oplus D}, \overline{C\oplus E}, \overline{C\oplus E}, \overline{D\oplus E}, \overline{D\oplus E}$ |
| 16 | 11 | $A, B, C, D, E, \overline{A}, \overline{A}, \overline{B}, \overline{B}, \overline{C}, \overline{C}, \overline{D}, \overline{D}, \overline{E}, \overline{E}, \overline{\overline{A}}, \overline{\overline{A}}, \overline{\overline{B}}, \overline{\overline{B}}, \overline{\overline{C}}, \overline{\overline{C}}, \overline{\overline{D}}, \overline{\overline{D}}, \overline{\overline{E}}, \overline{\overline{E}},$<br>$A\oplus B, A\oplus C, A\oplus D, A\oplus E, B\oplus C, B\oplus D, B\oplus E, C\oplus D, C\oplus E, D\oplus E,$<br>$\overline{A\oplus B}, \overline{A\oplus C}, \overline{A\oplus D}, \overline{A\oplus E}, \overline{B\oplus C}, \overline{B\oplus D}, \overline{B\oplus E}, \overline{C\oplus D}, \overline{C\oplus E}, \overline{D\oplus E},$<br>$\overline{\overline{A\oplus B}}, \overline{\overline{A\oplus C}}, \overline{\overline{A\oplus D}}, \overline{\overline{A\oplus E}}, \overline{\overline{B\oplus C}}, \overline{\overline{B\oplus D}}, \overline{\overline{B\oplus E}}, \overline{\overline{C\oplus D}}, \overline{\overline{C\oplus E}}, \overline{\overline{D\oplus E}},$ |
| 17 | 12.5 | $A, B, C, D, \overline{A}, \overline{A}, \overline{B}, \overline{B}, \overline{C}, \overline{C}, \overline{D}, \overline{D}, \overline{\overline{A}}, \overline{\overline{A}}, \overline{\overline{B}}, \overline{\overline{B}}, \overline{\overline{C}}, \overline{\overline{C}}, \overline{\overline{D}}, \overline{\overline{D}},$<br>$A\oplus B, A\oplus C, A\oplus D, B\oplus C, B\oplus D, C\oplus D,$<br>$\overline{A\oplus B}, \overline{A\oplus B}, \overline{A\oplus C}, \overline{A\oplus C}, \overline{A\oplus D}, \overline{A\oplus D}, \overline{B\oplus C}, \overline{B\oplus C}, \overline{B\oplus D}, \overline{B\oplus D}, \overline{C\oplus D}, \overline{C\oplus D},$<br>$\overline{\overline{A\oplus B}}, \overline{\overline{A\oplus B}}, \overline{\overline{A\oplus C}}, \overline{\overline{A\oplus C}}, \overline{\overline{A\oplus D}}, \overline{\overline{A\oplus D}}, \overline{\overline{B\oplus C}}, \overline{\overline{B\oplus C}}, \overline{\overline{B\oplus D}}, \overline{\overline{B\oplus D}}, \overline{\overline{C\oplus D}}, \overline{\overline{C\oplus D}}$ |

FIG. 10

SYSTEMS AND METHODS FOR QUANTUM-ENABLED ERROR CORRECTION

CROSS-REFERENCE TO RELATED APPLICATIONS AND CLAIM OF PRIORITY

This application claims the benefit of, and priority to, U.S. Provisional Patent Application No. 63/598,677, filed on Nov. 14, 2023, and U.S. Provisional Patent Application No. 63/432,746, filed on Dec. 15, 2022, the entire contents of each are hereby incorporated herein by reference.

GOVERNMENT SUPPORT

This invention was made with government support under 70NANB16H168 awarded by the National Institute of Standards and Technology (NIST), an agency of the United States Department of Commerce. The government has certain rights in the invention.

TECHNICAL FIELD

The present disclosure relates to quantum-enabled error correction. More specifically, the present disclosure relates to systems and methods for quantum-enabled error correction involving quantum measurement self-accuracy estimation.

BACKGROUND

Because noise is inherent to all measurements, optical communication requires error identification and correction to protect and recover user data. Yet, error correction, routinely used in classical receivers, has not been applied to receivers that take advantage of quantum measurement.

Accordingly, there is interest in analog-oriented quantum computing for continuous optimization.

SUMMARY

In an aspect of the present disclosure, a system for quantum-enabled error correction is presented. The system includes a receiver configured to receive an optical signal. The optical signal includes encoded information. The encoded information includes one or more communication alphabet symbols. The receiver includes a beam splitter, a local oscillator (LO) configured to produce destructive interference with the optical signal at the beam splitter, a single photon detector (SPD) configured to detect photons from an output of the beam splitter, a processor, and a memory. The memory includes instructions stored thereon, which, when executed by the processor, cause the system to: detect one or more photons by the SPD; determine a set of a posteriori Bayesian probability values based on a period of time of a previous state of the LO and based upon the one or more photons detected by the SPD; update the LO from a previous state to a next state; based on the highest a posteriori Bayesian probability; and determine a likelihood of each of the one or more communication alphabet symbols being correct based on the set of a posteriori Bayesian probability values. The next state of the optical LO is a new input state having a highest probability value that the next state matches the state of the optical signal.

In another aspect of the present disclosure, the system may further include a transmitter configured to transmit the optical signal. The transmitter may include a laser source and a modulator.

In another aspect of the present disclosure, the instructions, when executed, may further cause the system to identify a quantum state based on a displacement of the optical signal.

In another aspect of the present disclosure, the instructions, when executed, may further cause the system to determine a photon detection time for each of the one or more photons that are detected by the SPD.

In another aspect of the present disclosure, determining the likelihood of each communication alphabet symbol being correct may further be based on at least one of the previously applied LO states or the photon detection time for each of the one or more photons that are detected by the SPD.

In another aspect of the present disclosure, a state of the LO may only be changed from the previous state to the next state when one or more photons are detected by the SPD.

In another aspect of the present disclosure, the instructions, when executed by the processor, may further cause the system to perform error correction based on the determined likelihood of each of the one or more communication alphabet symbols being correct.

In another aspect of the present disclosure, each of some of the possible states of the optical LO may be tested for an arbitrary time independent of a number of photons detected by the SPD.

In another aspect of the present disclosure, the instructions, when executed by the processor, may further cause the system to identify only a state of the optical signal at the input of the receiver with the highest probability as a state identification outcome for that input state based on the determined likelihood of each of the one or more communication alphabet symbols being correct.

In an aspect of the present disclosure, a method for quantum-enabled error correction includes: receiving, by a receiver configured to receive optical signals, an optical signal including encoded information containing one or more communication alphabet symbols; detecting one or more photons by a single photon detector (SPD) of the receiver; determining a set of a posteriori Bayesian probability values based on a period of time of a previous state of the LO and based upon the one or more photons detected by the SPD; updating the optical LO from the previous state to a next state based on the highest a posteriori Bayesian probability; and determining a likelihood of each of the one or more communication alphabet symbols being correct based on the set of a posteriori Bayesian probability values. The next state of the optical LO is a new input state having a highest probability value that the next state matches the state of the optical signal In another aspect of the present disclosure, the method may further include transmitting the optical signal by a laser source and a modulator.

In another aspect of the present disclosure, the method may further include identifying a quantum state based on a displacement of the optical signal.

In another aspect of the present disclosure, the method may further include determining a photon detection time for each of the one or more photons that are detected by the SPD.

In another aspect of the present disclosure, determining the likelihood of each communication alphabet symbol being correct may further be based on at least one of the previously applied LO states or the photon detection time for each of the one or more photons that are detected by the SPD.

In another aspect of the present disclosure, a state of the LO may only be changed from the previous state to the next state when the one or more photons are detected by the SPD.

In another aspect of the present disclosure, the method may further include performing error correction based on the determined likelihood of each of the one or more communication alphabet symbols being correct.

In another aspect of the present disclosure, each of some of the possible states of the optical LO may be tested for an arbitrary time independent of a number of photons detected by the SPD.

In another aspect of the present disclosure, the optical signal received by the receiver may have an input state at a point in time. The method may further include identifying only the input state with the highest probability as a state identification outcome for that input state based on the determined likelihood of each of the one or more communication alphabet symbols being correct.

In an aspect of the present disclosure, a system for quantum-enabled error correction includes a receiver configured to receive an optical signal and detect photons. The optical signal includes encoded information. The encoded information includes one or more communication alphabet symbols. The receiver includes a processor and a memory. The memory includes instructions stored thereon, which, when executed by the processor, cause the system to: detect one or more photons by the receiver; determine a set of a posteriori Bayesian probability values based on modulating an optical LO of the receiver for a period of time where a state of the optical LO matches a state of the optical signal; and determine a likelihood of each of the one or more communication alphabet symbols being correct based on the set of a posteriori Bayesian probability values. The optical signal, received by the receiver, has an input state at a point in time.

In another aspect of the present disclosure, the instructions, when executed by the processor, further cause the system to perform error correction based on the determined likelihood of each of the one or more communication alphabet symbols being correct.

Further details and aspects of exemplary aspects of the present disclosure are described in more detail below with reference to the appended drawings.

BRIEF DESCRIPTION OF THE DRAWINGS

A better understanding of the features and advantages of the present disclosure will be obtained by reference to the following detailed description that sets forth illustrative aspects, in which the principles of the present disclosure are utilized, and the accompanying drawings of which:

FIG. 10 is a table that lists and describes exemplary error correction codes that can be used with the system of FIG. 1, in accordance with examples of the present disclosure.

DETAILED DESCRIPTION

The present disclosure relates to quantum-enabled error correction. More specifically, the present disclosure relates to systems and methods for quantum-enabled error correction involving quantum measurement self-accuracy estimation.

Aspects of the present disclosure are described in detail with reference to the drawings wherein like reference numerals identify similar or identical elements.

Although the present disclosure will be described in terms of specific examples, it will be readily apparent to those skilled in this art that various modifications, rearrangements, and substitutions may be made without departing from the spirit of the present disclosure. The scope of the present disclosure is defined by the claims appended hereto.

For the purpose of promoting an understanding of the principles of the present disclosure, reference will now be made to exemplary aspects illustrated in the drawings, and specific language will be used to describe the same. It will nevertheless be understood that no limitation of the scope of the present disclosure is thereby intended. Any alterations and further modifications of the novel features illustrated herein, and any additional applications of the principles of the present disclosure as illustrated herein, which would occur to one skilled in the relevant art and having possession of this disclosure, are to be considered within the scope of the present disclosure.

The exchange of physical states and their measurement are required for any communication. The tradeoff between the number of physical resources used and the chance of erroneous transmission is fundamental, owing to the nature of measurement. In the absence of error correction mechanisms, reliable communication requires significant energy and bandwidth use. A quantum measurement can reduce the symbol error rate (SER) beyond what is possible with classical state identification, particularly when faint states of light are used for communication. The SER is commonly defined as a ratio of the number of state identification measurement outcomes resulting in the wrong state (symbol) to the total number of states (symbols) transmitted to the receiver. The present disclosure illustrates how error correction can also be enhanced by taking advantage of quantum measurement.

A significant research effort in quantum-enhanced communications is ongoing, and experimental results demonstrate error rate suppression below the classical shot-noise limit (SNL). These experiments achieved below the SNL symbol error rates with the optical signal energy of just about one photon per bit at the receiver. This result is impressive from a fundamental point of view. Yet, error rates at this input energy are too high for practical use, even with the quantum enhancement. One of the ways to reduce the error rate is to increase the power of the optical carrier. Unfortunately, higher power often results in saturation of quantum receivers due to experimental deficiencies such as imperfect displacement to a vacuum state.

The present disclosure implements a different approach: multiple symbols are combined, each containing just one photon per bit, into a codeword. The disclosed systems and methods expand forward error correction (FEC) for quantum receivers and demonstrate that confidence a posteriori probabilities (CAPPs) improve the performance of forward error correction codes. Multiple different quantum-enabled forward error correction (QEFEC) codes were tested. The disclosed methods yield a record-low symbol error rate of about 10-9, approximately 40 dB below the QPSK classical error limit for 11 photons per bit at the receiver. Thus, the present disclosure illustrates that the use of quantum-enabled FECs provides the benefit of yielding better results with quantum receivers than merely increasing the input energy.

Figure 1:
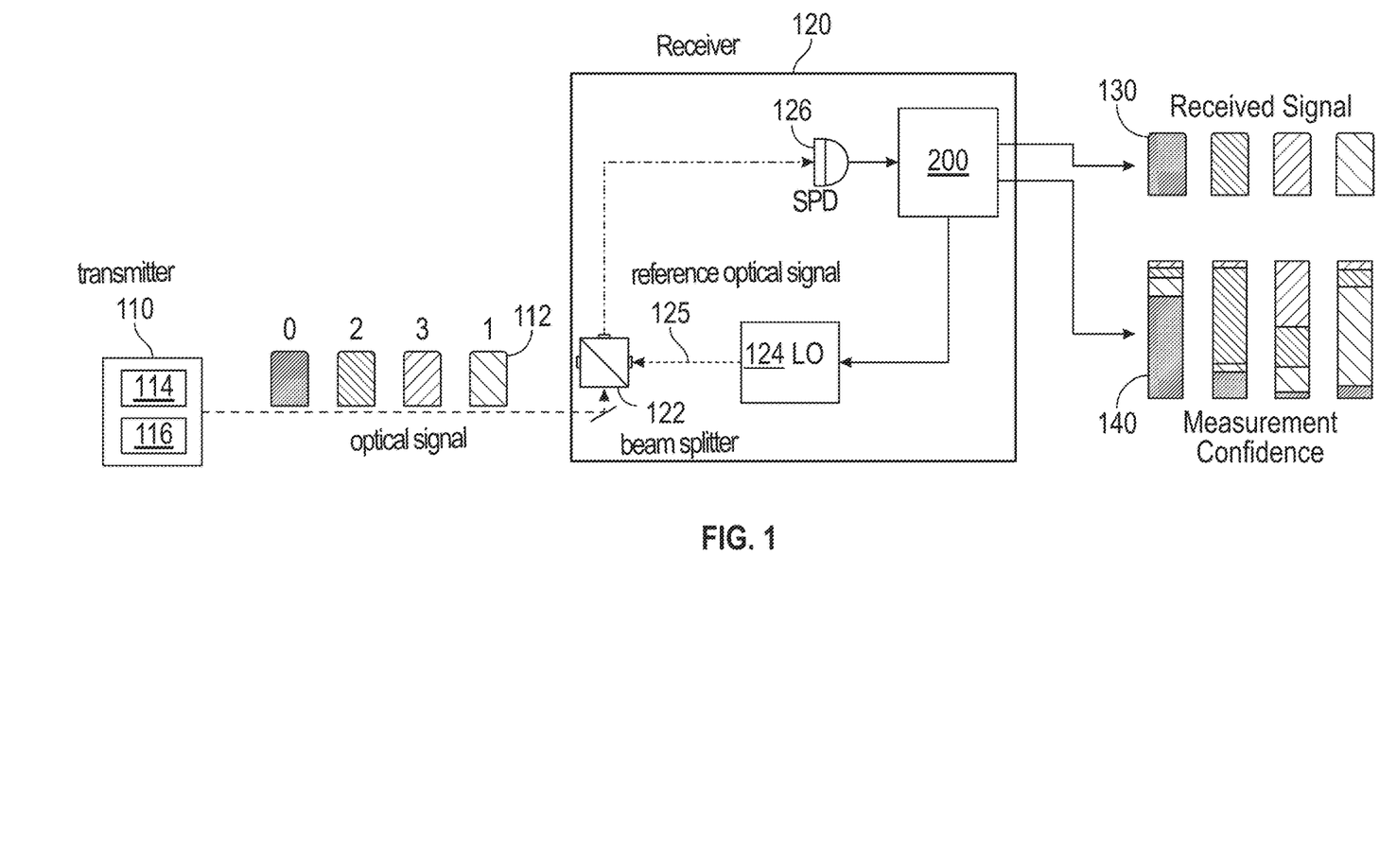
FIG. 1 is a diagram of an exemplary system for quantum-enabled error correction, in accordance with examples of the present disclosure.
Figure 2:
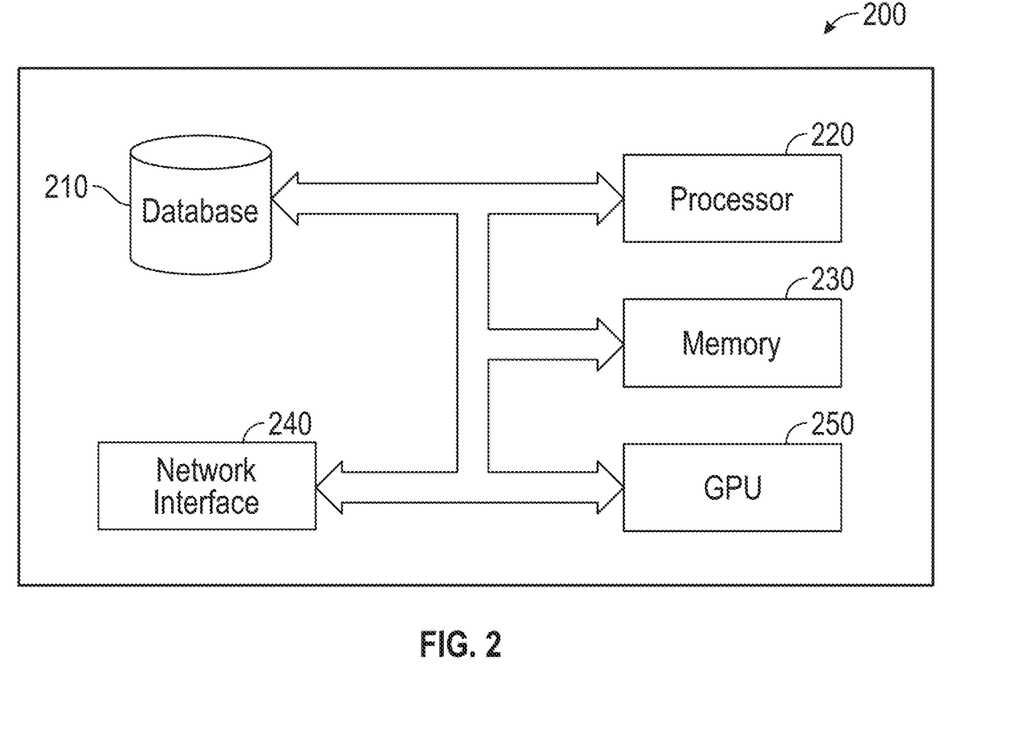
FIG. 2 is a block diagram of a controller of the system of FIG. 1, in accordance with examples of the present disclosure.
Figure 3:
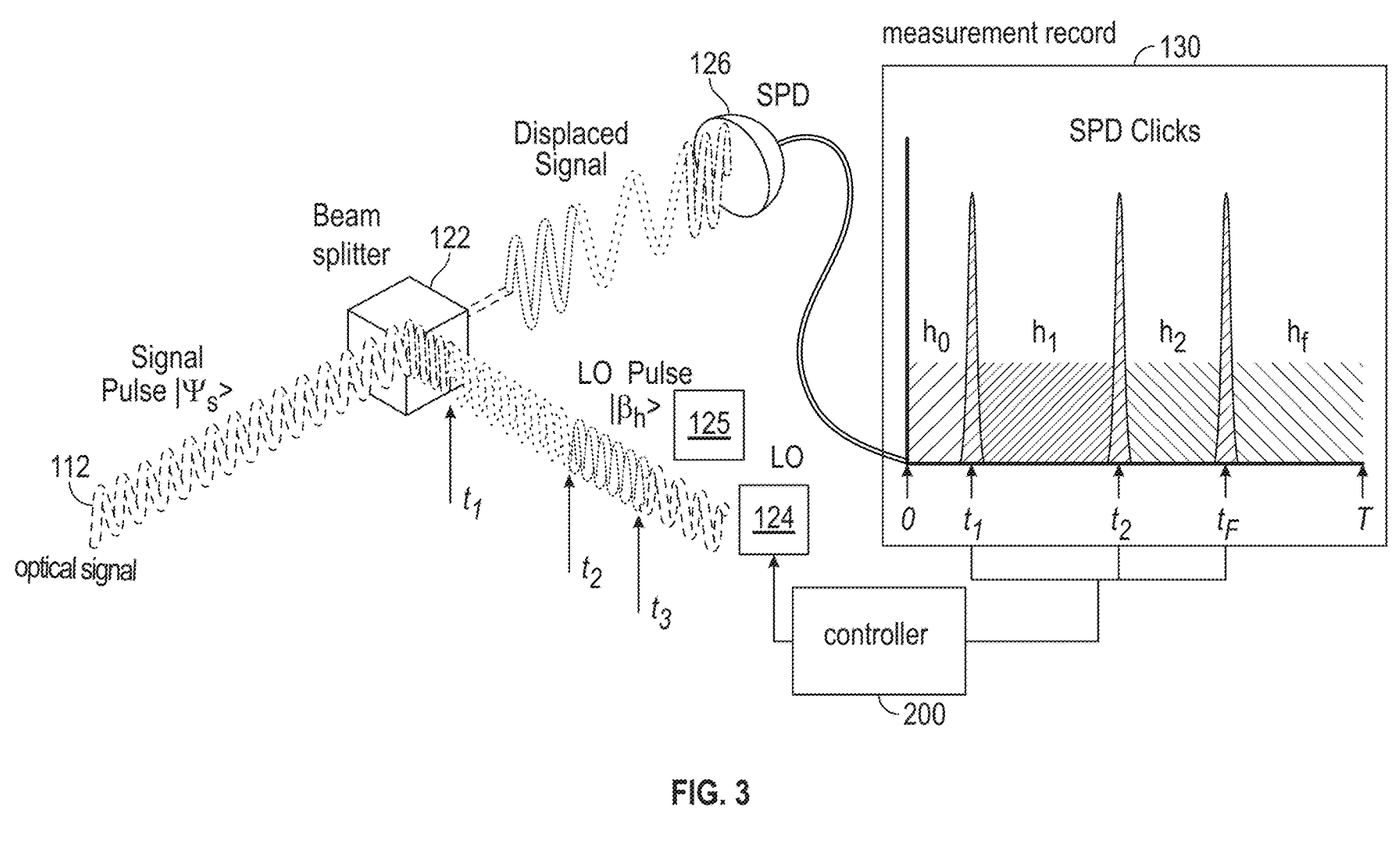
FIG. 3 is a diagram of the an exemplary receiver 120 of FIG. 1, in accordance with examples of the present disclosure; it also includes an exemplary illustration of a measurement record 130 consisting of photon detection times $\{t_1, t_2, \ldots, t_{f_s}\}$ and history of LO states $\{h_0, h_1, \ldots, h_{f_s}\}$.

Referring to FIGS. 1-3, a diagram of an exemplary system 100 for quantum-enabled error correction, in accordance with the present disclosure, is shown. The system 100 generally includes a receiver 120 configured to receive an optical signal 112. The optical signal 112 includes encoded information. The encoded information includes one or more communication alphabet symbols. In aspects, the system 100 may include a transmitter 110 configured to encode information in an optical signal. The transmitter 110 may include, for example, a laser source 114 and a modulator 116.

The receiver 120 generally includes a beam splitter 122, an optical local oscillator (LO) 124 configured to produce destructive interference with the optical signal 112 at the beam splitter 122, a single photon detector (SPD) 126 configured to detect photons, and a controller 200. The receiver 120 is configured to provide a self-accuracy estimation of a continuous quantum measurement. These estimations are physically meaningful, wherein estimations accurately represent the best knowledge about the input state post-measurement. There is a superior advantage of the simple QEFEC using continuous self-accuracy estimates in quantum-enhanced classical communication channels for QPSK experimental and simulated data. An extension of the QEFEC for long alphabet encodings can include 8-PSK, 16-PSK, or CFSK/HFPSK family of encodings.

The SPD 126 is configured to detect photons based on the output of the beam splitter 122. The SPD 126 may include a superconducting nanowire SPD (SNSPD). For example. a bias just below a maximum supercurrent that the nanowire can sustain may be applied to the SNSPD, so that a single photon absorbed by the nanowire can locally break superconductivity, giving rise to a brief voltage pulse that can be detected by the controller 200.

Quantum measurements can significantly surpass classical measurements and can asymptotically approach the fundamental limits of accuracy.

In quantum-enabled error correction, the receiver 120 provides a single-shot self-accuracy estimation of continuous quantum measurement. The receiver 120 determines a measurement confidence 140 (i.e., accuracy, likelihood) for each single-shot quantum measurement outcome as a complete set of Bayesian probabilities that the measured system was in one of the possible quantum states. The set of these estimates for one measurement is called the confidence a posteriori probability (CAPP) vectors. For example, the measurement may include trying and assigning an incoming state to a signal. Although single-shot quantum measurements are described, the disclosed systems and methods are applicable to continuous measurements.

In aspects, CAPP can be used for at least the following: selecting or accepting only those measurements where one of the probabilities in CAPP is arbitrarily close to unity (theoretically, it can be unity, but noise in practical systems prevents unit probabilities in most cases); discarding or repeating those measurements where probabilities of CAPP are significant for more than one output state; or improving soft-decision-based error correction. One example is forward error correction (FEC).

FEC codes may be based on the received CAPP vectors. FEC codes can improve the error rate from the measured symbol error rate (SER). For example, the error correction protocols may be applied to the raw data obtained for received QPSK optical pulses containing just two photons (1.49 photons detected due to the receiver system efficiency of about 74.5%). Each QPSK symbol contains 2 bits of information so that the energy at the receiver is 0.75 photon/bit. Under these conditions, the measured raw SER is about 10%. This provides an error-correcting protocol that yields a record-low SER of $2.3 \times 10^{-7}$, more than 20 dB below the corresponding classical error limit, and requires energy of just 7.5 photons per bit at the receiver input. Direct experimental quantum measurement (i.e., without the benefit of CAPP) of QPSK states with 7.5 photons/bit), yields significantly lower SER (by about 15 dB).

Embodiments of the quantum-enabled error correction provide sub-shot noise (below classical limit) error correction for quantum receivers with CAPP, exceeding conventional technology. Because this SER is achieved with very short codewords (consisting of 30 symbols), i.e., shorter than what is conventionally used for high-performance encodings, the decoding process is less computationally demanding and more energy efficient. CAPP can be used as input for high-performance encodings such as turbo codes and low parity density codes.

Those encodings are known to approach the maximum classical channel capacity for classical receivers. Because the system 100 uses a quantum receiver with lower bounds, the quantum-enabled error correction can exceed classical channel capacity.

The quantum-enabled error correction can include low signal intensity at the detector; the overall intensity in the communication channel can be lower than in an ordinary channel, enabling the coexistence of quantum and classical communication channels in a single optical fiber. For the same reason, amplification-free long-distance fiber or free-space (interplanetary) optical communication can be provided or improved.

The quantum-enabled error correction is compatible with quantum measurements that can output a CAPP vector. The quantum-enabled error correction can provide lower (by several orders of magnitude) power levels for communication with any given error rate. As a result, fewer transceivers or amplifiers can be included in commercial optical communication channels. The quantum-enabled error correction can provide longer amplification-free communication channels. Quantum-enabled error correction can provide reliable communication with simple and energy-efficient codes using short codewords and with maximum channel capacity approaching practical codes.

It is contemplated that the performance of modified turbo codes can take single-shot confidence estimates as the input. The quantum-enabled error correction can include CAPP extracted from continuous quantum measurement. With regard to phase synchronization methods for the quantum-enabled error correction, the LO 124 of the receiver can be phase-stabilized to the input signal of the receiver 120. This can be accomplished by using the same laser to derive the input optical signal 112 and the LO 124. Two separate, long coherence length lasers may be used either in the receiver 120 or the transmitter 110. Phase stabilization may be accomplished with any hardware-based or algorithm-based protocol. A transmitter periodically can send a specific state of light to the receiver (that can be brighter than the states used for data transmission), and the receiver measures the difference between the received phase and the expected phase. This procedure is followed by parameter adjustments at the receiver or transmitter. The period of stabilization pulses in this example is determined by the coherence lengths of the transmitter and receiver lasers and the phase stability of the communication channel. Different information can be drawn at the output (confidence information), and the output can be used for forward error correction. Other devices that perform quantum measurement can also be used to provide confidence information. The quantum-enabled error correction takes advantage of quantum measurement self-accuracy estimation.

Referring now to FIG. 2, exemplary components in the controller 200 in accordance with aspects of the present disclosure include, for example, a database 210, one or more processors 220 (e.g., an FPGA, a microcontroller, etc.), at least one memory 230, and a network interface 240. In aspects, the controller 200 may include a graphical processing unit (GPU) 250.

The database 210 can be located in storage. The term "storage" may refer to any device or material from which information may be capable of being accessed, reproduced, and/or held in an electromagnetic or optical form for access by a computer processor. Storage may be, for example, volatile memory such as RAM, non-volatile memory, which permanently holds digital data until purposely erased, such as flash memory, magnetic devices such as hard disk drives, and optical media such as a CD, DVD, Blu-ray disc, or the like.

In various embodiments, data may be stored on the controller 200, including, for example, user preferences, historical data, and/or other data. The data can be stored in the database 210 and sent via the system bus to the processor 220.

As will be described in more detail later herein, the processor 220 executes various processes based on instructions that can be stored in the server memory 230 and utilizing the data from the database 210. The illustration of FIG. 2 is exemplary, and persons skilled in the art will be understood other components that may exist in a controller 200. Such other components are not illustrated in FIG. 2 for clarity of illustration.

Figure 4:
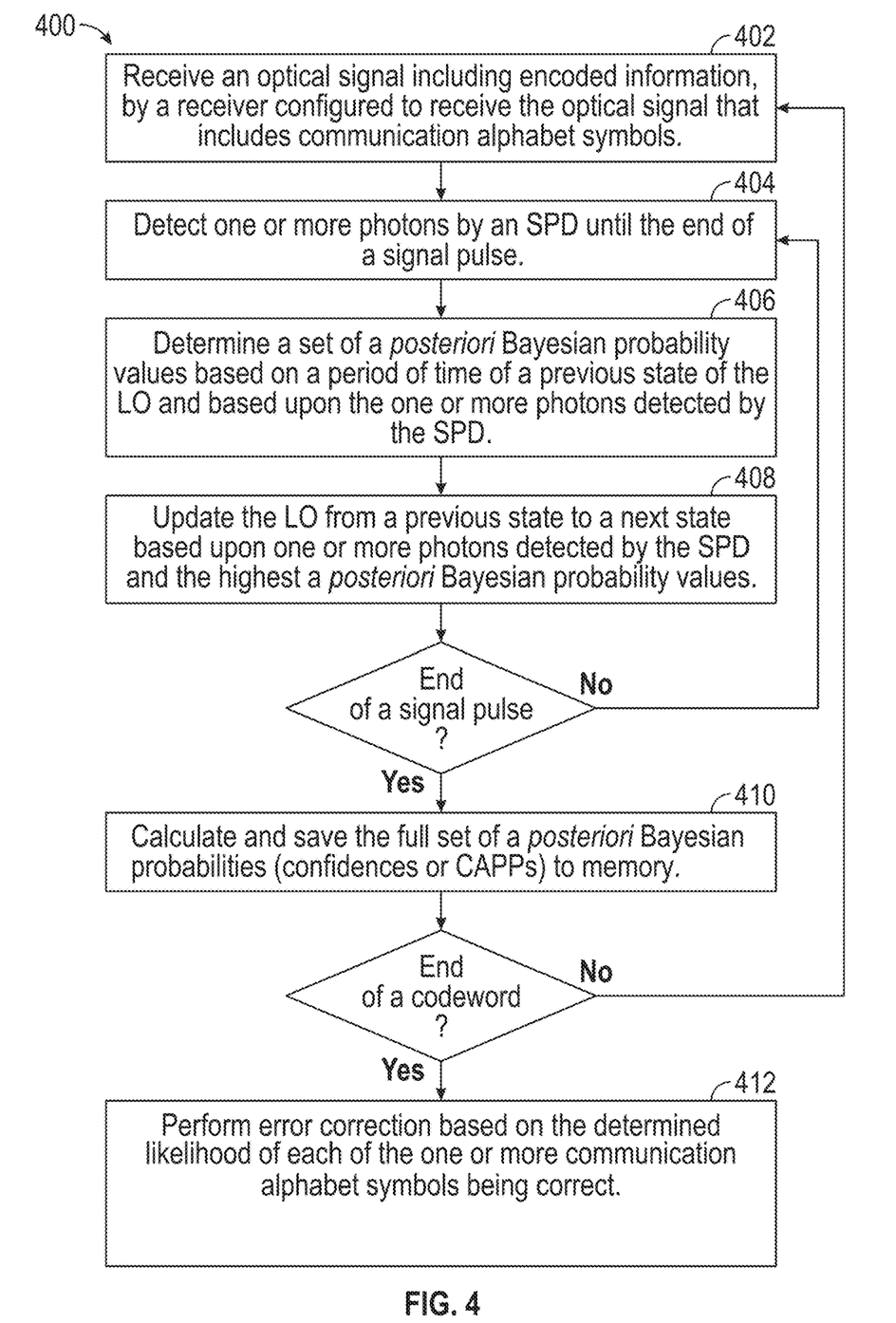
FIG. 4 is a diagram of a method of using the system of FIG. 1, in accordance with examples of the present disclosure.

Referring to FIG. 4, a processor-implemented method 400 for quantum-enabled error correction, using the system 100 of FIG. 1 is shown. The system 100 for quantum-enabled error correction may include a processor and a memory including instructions stored thereon, which, when executed by the processor 220, cause the system 100 to perform the steps of method 400.

Initially, at step 402, the processor 220 causes the system 100 to obtain an optical signal. For example, the optical signal 112 may be received by the receiver 120. The optical signal 112 includes encoded information, for example, one or more communication alphabet symbols. An optical local oscillator LO 124 is controlled by the processor 220 to produce reference optical signal 125 for destructive interference with the optical signal at the beam splitter 122 (FIG. 3).

For example, the optical signal 112 may use quadrature phase shift keying (QPSK), where each symbol encodes $\log_2 4 = 2$ bits. The QPSK alphabet consists of four coherent state $|\alpha_m\rangle$ with the same mean photon number $n = |\alpha|^2 = |\alpha_m|^2$, and complex parameter $\alpha_m = |\alpha| e^{im\pi/2}$, where $m \in \{0, 1, 2, 3\}$. Symbols are encoded as flat-top laser pulses.

Next, at step 404, the processor 220 causes the system 100 to detect one or more photons by the SPD 126 (FIG. 1).

Next, at step 406, the processor 220 causes the system 100 to determine a set of a posteriori Bayesian probability values based on a period of time of a previous state of the LO and based upon the one or more photons detected by the SPD.

If the state of the LO matches the state of the optical signal, the probability of detecting photons by SPD is very low because of the destructive interference; in the absence of photon detections, the LO will remain in a correct state matching the optical signal and will allow the correct symbol to be received.

The quantum state identification is based on a displacement of the input optical signal that occurs on a $\mathcal{R} : \mathcal{T} \approx 1:99$ fiber beam splitter (FBS). The displaced state may be measured with the SPD 126, for example, a superconducting nanowire single-photon detector (SNSPD) with high detection efficiency and low dark count rate operating at 800 mK.

If the optical LO 124 state matches the input state, no photons reach the SPD 126. Otherwise, the displacement at the beam splitter 122 will result in a higher probability of detecting photons at the output. The detection of a photon indicates that the LO output and the optical signal 112 of the receiver are not matched. Therefore, the longer no photons are detected, the higher the chance that the optical LO state matches the input optical signal 112, which can be expressed as a Bayesian probability. If a photon is detected, the current LO state most probably does not match the input, so the new LO state is identified.

For example, the measured mean photon number of the input state is 2 photons/pulse, and the LO is approximately 100 times stronger than the input state before the beam splitter 122. The symbol duration is T=64.4 μs, which is normalized to a unit length T=1, because the actual duration of the signal pulse is not relevant to the results of this work. The measured visibility of the interferometer is about 99.4%. The system efficiency is about 88.5%, which includes propagation loss of about 7.5% and detection efficiency of about 95.7%, where the uncertainties are mainly due to the statistical uncertainty of calibrating the attenuators.

Next, at step 408, the processor 220 causes the system 100 to update the optical LO from the previous state to a next state based on the highest a posteriori Bayesian probability. Steps 404 to 408 are repeated until the end of a signal pulse.

Bayesian inference is employed to identify the most likely state and calculate the likelihood of each communication alphabet symbol using the measurement record consisting of the history of previously applied LOs and photon detection times. Then, the optical LO 124 is switched to the new, most likely input state. At the end of the signal pulse, CAPPs are the set of a posteriori Bayesian probabilities inferred from the adaptive measurement.

Next, at step 410, repeat the previous steps until a codeword is received, and confidences (CAPPs, a posteriori Bayesian probabilities) for each received symbol of the codeword are stored in memory. The processor 220 causes system 100 to determine the likelihood of each of the one or more received communication alphabet symbols being correct (relative to the communication alphabet symbols originally transmitted) based on the set of a posteriori Bayesian probability values and a set of possible codewords.

Next, at step 412, perform error correction based on the determined likelihood of each of the one or more communication alphabet symbols being correct. For example, the error correction may be performed by calculating the codeword with the highest cumulative probability (e.g., the product of the CAPPs for each symbol of the codeword).

In aspects, the system 100 can be used with advanced error correction codes that can use soft decoding.

Figure 5:
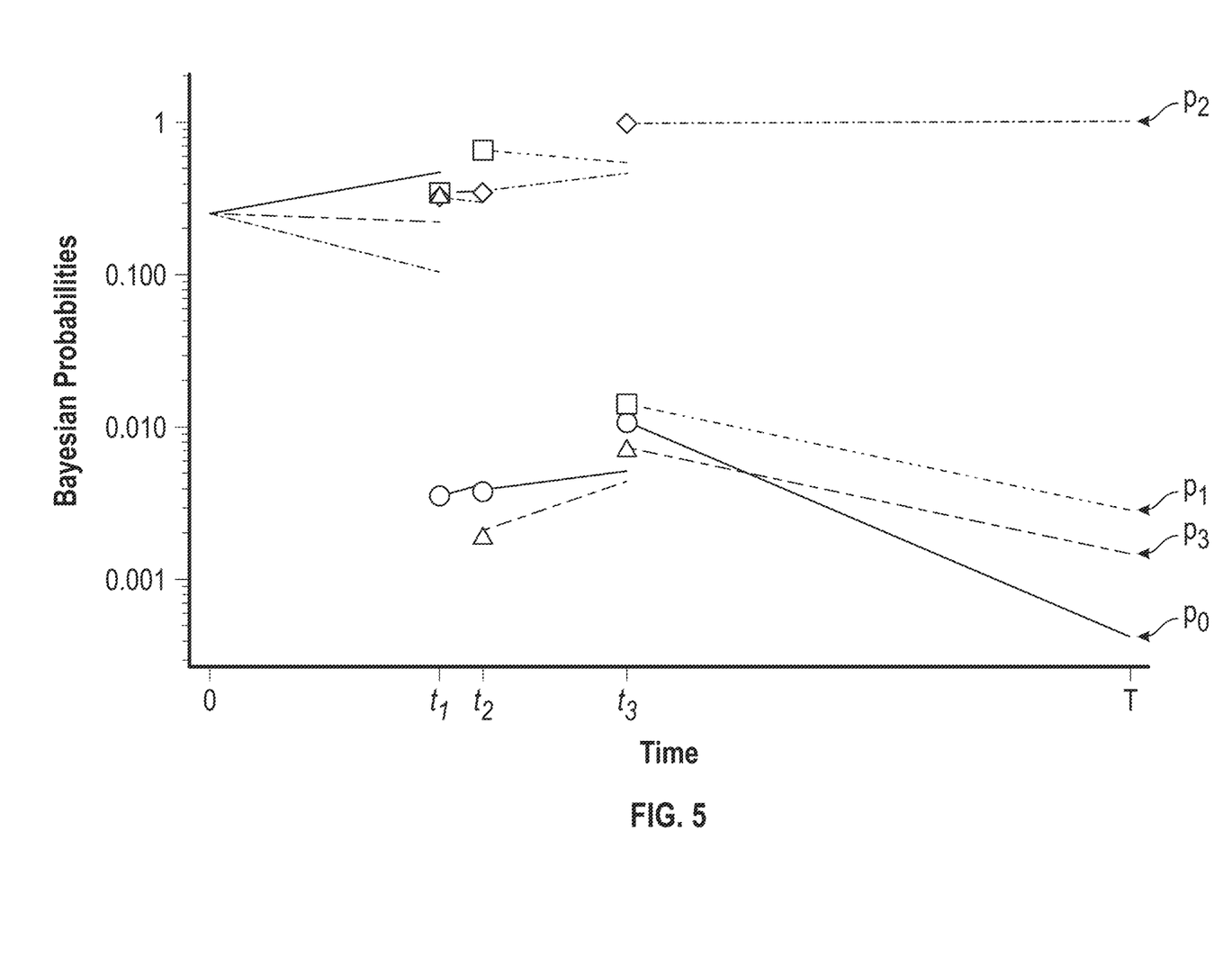
FIG. 5 is a graph illustrating an exemplary confidence (likelihood, Bayesian probabilities, CAPPs) level measurement for the system of FIG. 1, in accordance with examples of the present disclosure.

Referring to FIG. 5 is a graph illustrating a confidence level measurement for the experimentally measured $\vec{P}(t)$ in a single-shot measurement of the system of FIG. 1. Single photon detections occur three times at $t_1$, $t_2$, and $t_3$.

For example, consider a single-shot state identification problem where only a single copy of the input state $\phi_s$, $s \in 1, \ldots M$ is available. Without the loss of generality, it is assumed that $\{\phi_s\}$ are in a single spatial mode and focus on temporal dynamics. Advantage is taken of the fact that the continuous measurement of the state $|\phi\rangle$ is made over time T, where T is the duration of the input pulse. In the continuous limit, the measurement operator is:

$$\hat{\pi} = \lim_{dt \to 0} (\hat{C}_T \hat{U}_T \times \ldots \times \hat{C}_{2dt} \hat{U}_{2dt} \hat{C}_{dt} \hat{U}_{dt}),$$

where $\hat{U}$ denotes a transformation of the state, such as coherent displacement, and $\hat{C}$ describes photon counting on the interval dt. Note that the chance to detect more than one photon during dt→0 is negligible for weak coherent states. The outcome of this continuous measurement is unique for each individual measurement attempt. It consists of the history of all measurements $\lambda$ and all applied transformations: $\mathbb{Z}[0, t] = (\lambda_t, \ldots, \lambda_{2dt}, \lambda_{dt}; \hat{U}_t, \ldots, \hat{U}_{2dt}, \hat{U}_{dt})$. The measurement record $\mathbb{Z}[0, t]$, where $t \leq T$ provides a temporal history, which gives the number and exact times of photodetection events. When $t=T$, the measurement history is complete, otherwise the record is incomplete. The conditional probability $p(\mathbb{Z}[0, t] | @s)$ that a given measurement record $\mathbb{Z}[0, t]$ occurs if the input was in a state $\phi_s$, can be computed using a model of the experiment. The model can account for experimental imperfections, such as non-ideal displacement and dark noise of the detector. Then, the probability $p(\phi_s | \mathbb{Z}[0, t])$ that the input state is $\phi_s$ once the record $\mathbb{Z}[0, t]$ is obtained is given by the Bayes formula:

$$p(\phi_s | \mathbb{Z}[0, t]) = \frac{p(\mathbb{Z}[0, t] | \phi_s) \tilde{p}_s}{p(\mathbb{Z}[0, t])},$$

where $\vec{P}_0 = \{\tilde{p}_s\}$ is the probability to encounter an input state $\phi_s$, which is typically known from the formulation of the problem. A vector of probabilities $\vec{P} = \{p(\phi_s | \mathbb{Z}[0, t])\}$, is formed, whose components represent the best knowledge about the input state during (t<T) and after (t=T) the measurement. Both $\mathbb{Z}[0, T]$ and $\vec{P}$ are calculated using experimentally measured period of time of a previous state of the LO and one or more photons detected by the SPD or photon detection times and the LO states or their combination.

Generally, the choice of unitary transformations applied to a measured state $\{\hat{U}\}$ depends on the choice of the figure of merit of the measurement and the set of $\phi_s$. If an unambiguous state discrimination is sought, the interval T can, for example, be divided into M sub-intervals, during which all M hypotheses are tested. In a Boundurant receiver, the tested hypothesis is changed every time a photon detection occurs. If minimizing the probability of erroneously identifying the state is desired, feedback is employed. That is, at time t a hypothesis is selected using the maximal likelihood estimation from the incomplete measurement record $\mathbb{Z}(0, t)$ and tested until either a different hypothesis becomes more likely or the end of the pulse T.

For example, the input is in one of M=4 input flat-top coherent states that differ by phase: $|\phi_s\rangle = |\alpha((m-1)2\pi/M)$. The measurement consists of the coherent displacement stage and the single-photon detector. Based on minimizing the probability of a wrong identification, the displacement adapts according to the following rules. At t=0, the LO is set to state $h_0$ that corresponds to displacing the state with the highest initial probability max $(\tilde{p}_s)$ (or a random state if all components of $\vec{P}_0$ are the same) to vacuum. During the measurement, the incomplete detection record $\mathbb{Z}[0, t]$ is used to update the hypothesis. Unless a photon is detected, components of the vector $\vec{P}$ evolve continuously. Once a photon is detected at $t_i$, the probability $p_{h_{i-1}}$ gets reduced, while other probabilities become higher. Evidently, with ideal displacement and noiseless detection the conditional probability that the input state is $h_{i-1}$ reduces to zero if a photon is detected at $t_i$, however, this condition cannot be satisfied in a practical measurement. In practice, updates of h only occur when a photon is detected at time $t_i$. The updates of h follow the Bayesian inference, with the incomplete record $\mathbb{Z}[0, t_i]$ 130 (FIG. 3). The temporal evolution of $\vec{P}(t)$ as a function of the incomplete detection record is experimentally obtained (FIG. 5). At the end of the measurement t=T the vector $\vec{P}$ is recorded. The values of $\vec{P}$ are unique to each "shot"—or a full measurement record of one input signal due to the stochastic nature of photon detection. In minimum error measurements, the largest component of $\vec{P}$ typically identifies the received signal. The whole measurement records and the values of all $\vec{P}$ vector's components $p(\phi_s | \mathbb{Z}[0, T])$ are obtained and used.

Figure 6:
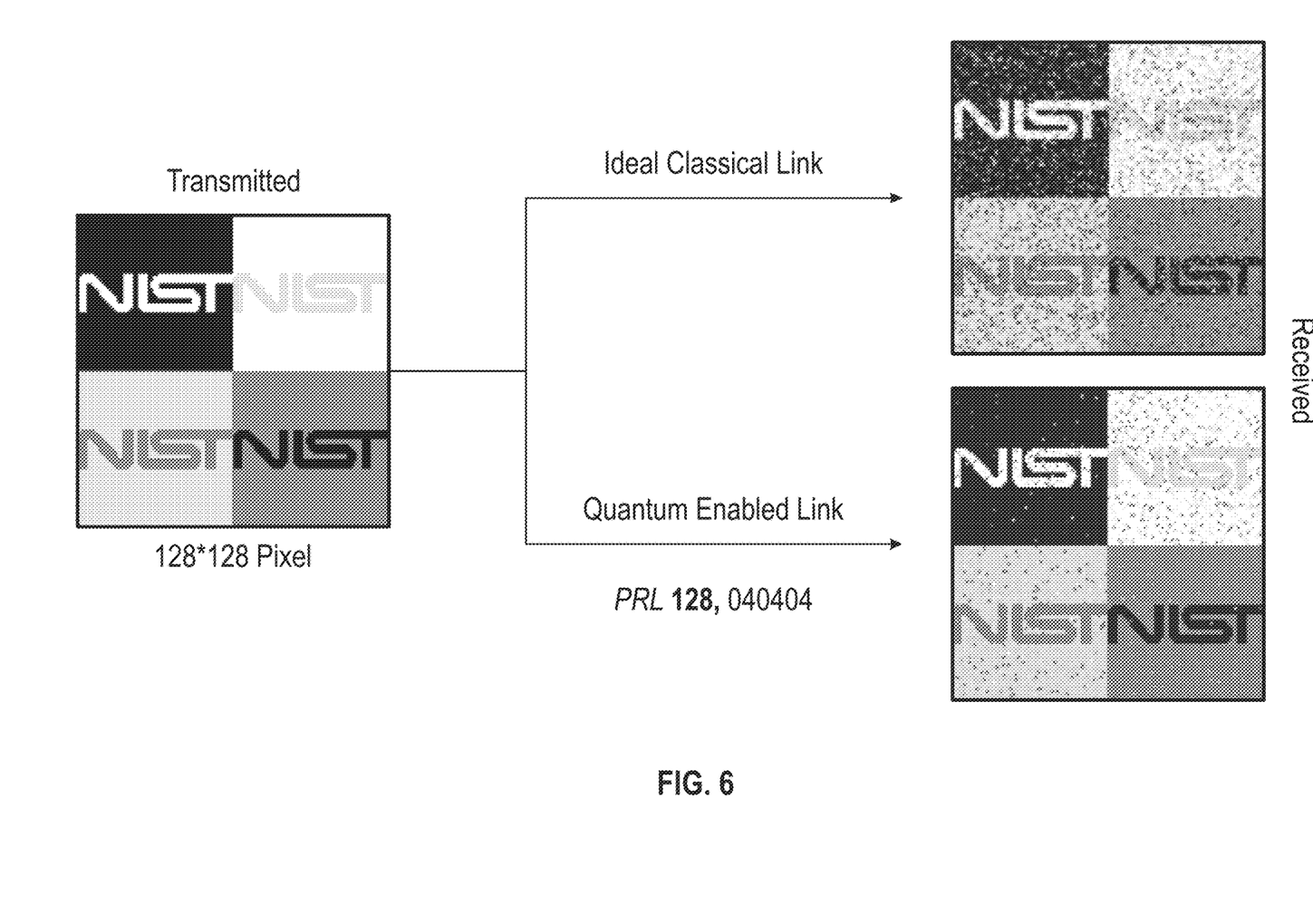
FIG. 6 is a diagram illustrating an exemplary comparison of an output of a quantum-enabled link with CAPPs using the system of FIG. 1 but without error correction vs. a simulated CAPPs output of a classical link, in accordance with examples of the present disclosure.

FIG. 6 is a diagram illustrating a comparison of CAPPs output of a quantum-enabled link using the system of FIG. 1 vs. CAPPs output of a classical link.

Before measuring each input signal, the vector of Bayesian probabilities is set to equal probabilities $\vec{P}(0) = \{0.25, 0.25, 0.25, 0.25\}$, which is a common situation for data communication applications. The exact pattern of photon detections is unique to each measurement "shot," hence $\vec{P}$ is unique each time the measurement concludes.

During each measurement, $\vec{P}$ evolves in time; the incomplete detection record is retrieved and reconstruct $\vec{P}(t)$, FIG. 5. The example of $\vec{P}$ acquired for each measurement separately is presented in FIG. 6. The original 128×128 image is comprised of 16384 single-shot measurements. Each pixel represents one input symbol, and each of the 4 primary colors (cyan, magenta, yellow, and black) corresponds to an input state $|\phi_1\rangle \ldots |\phi_4\rangle$ of the alphabet; every possible input state is sent 4096 times. Upon single shot measurements, the same image is reconstructed using the best available knowledge about the input states, $\vec{P}$. Received pixels can have an arbitrary color, because all 4 components of $\vec{P}$ may be nonzero. If a measurement determines the input state correctly and with low uncertainty, pixels on the reconstructed image are almost indistinguishable from the original. Some pixels appear as off-color "polka dots". They range from nearly indistinguishable from a primary color, in which case the confidence of the measurement is poor to high contrast, where the confidence is high. Bright "polka dots"—i.e., pixels that are close to a visually incorrect primary color—are measurement errors. In this case, most of the pixels are close to the primary color, because the overall error rate in this experiment is fairly low, that is, about 4.7%. To compare the accuracy of this measurement to an ideal classical measurement. A simulated reconstructed image is plotted using the same input conditions and assuming the ideal shot-noise limited homodyne detector. A higher number of lower-confidence measurements can be seen. This result is not surprising, because the measurement method is not constrained by the shot noise, while classical measurement is.

The single-shot fidelity estimate can be introduced as $\mathcal{F} = \vec{P}\vec{S}$, where $\vec{S}$ is the input state (when $|\psi_2\rangle$ is sent, the components of $\vec{S}$ are $S_i = \delta_{i,s}$, where $\delta$ is the Kronecker delta). For a large ensemble of measurements, all estimates $\mathcal{F}$ may be grouped into 10%-wide bins. $N\mathcal{F}$, the total number of trials whose fidelity estimate falls into each bin normalized on the total number of trials $N_{Trials}$, are computed and plotted. The experimental data is compared with the simulated ideal homodyne measurement with unit efficiency using the same input conditions. FIG. 6 illustrates that measurement produces high fidelity ($\mathcal{F} > 0.8$) results about 1.17 times more often than the ideal classical measurement. Note that the number of measurement outcomes with lower fidelity is significantly lower for the measurement in comparison to the ideal homodyne measurement. In particular, the homodyne measurement returns almost an order of magnitude more outcomes with $\mathcal{F} \approx 0.5$. Therefore, the quantum measurement unconditionally provides more definitive information about the input state. In aggregate, the average fidelity of the quantum measurement is $\langle \mathcal{F} \rangle = 0.874$ (1), whereas the average fidelity of the idealized classical measurement is $\langle \mathcal{F} \rangle = 0.854(1)$ before error correction.

Figure 7:
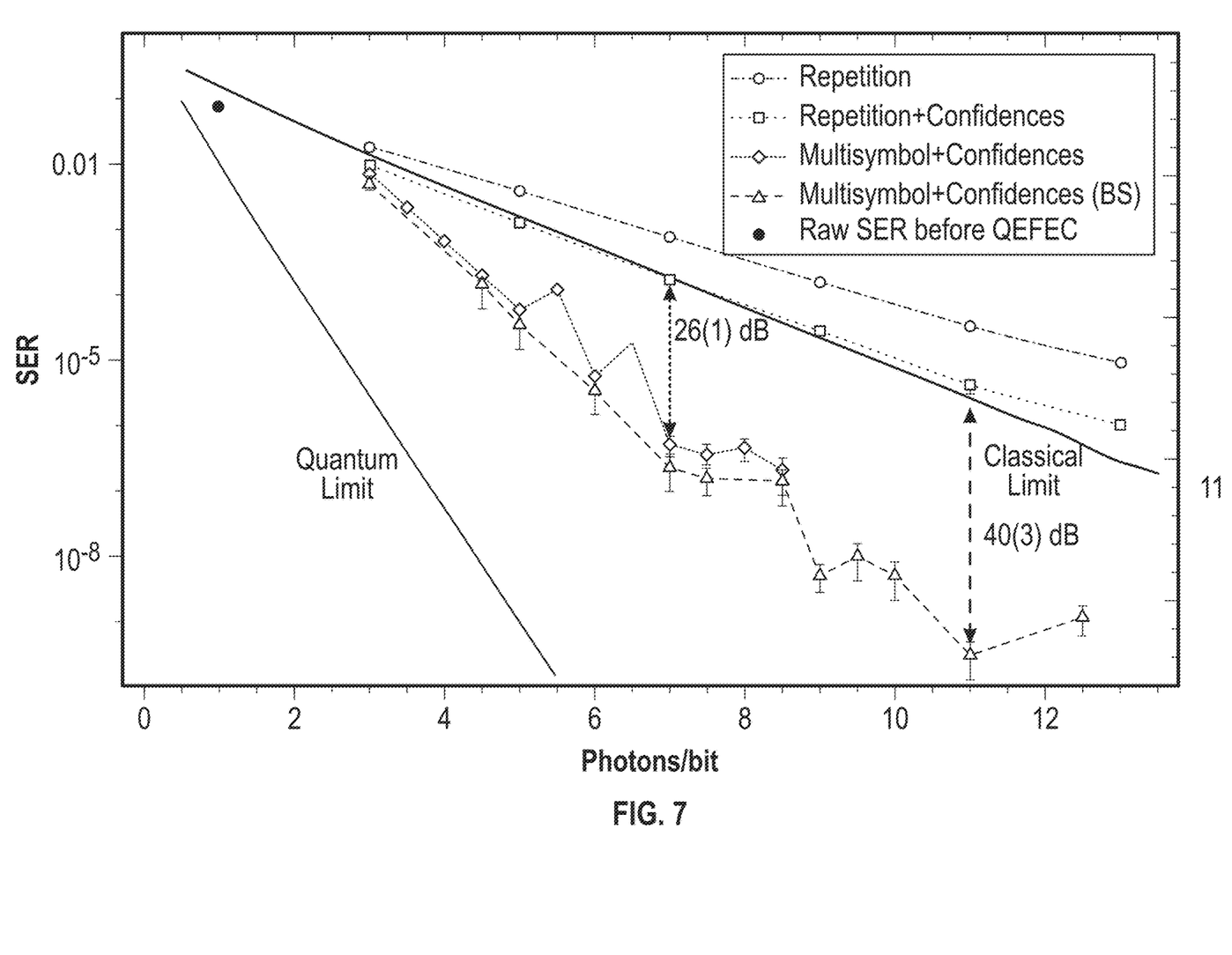
FIG. 7 is a graph illustrating symbol error rate (SER) vs. photons per bit for the system of FIG. 1 without the error correction and with different error correction protocols using and not using CAPPs, in accordance with examples of the present disclosure.

FIG. 7 is a graph illustrating the experimental performance of QEFEC strategies performed by the system 100. The system 100 enables a reduction in symbol error rate using naive and quantum-inspired FEC protocols. For example, the naive, simple vote repetition coding improves the SER but does so rather inefficiently (Repetition). Indeed, the raw received data has the SER below the QPSK shot-noise limit (SER of about 8.3% at 1 photon per bit), but the cumulative energy of repeated symbols grows faster than the observed reduction in SER when compared to the ideal classical receiver. In contrast, the single-shot CAPPs (Repetition+Confidences), available from the quantum measurement, significantly improve SER when used for error correction. Therefore, in a head-to-head comparison of decoding the same repetition code, the strategy which uses the maximum cumulative confidence derived from CAPPs provides better performance (Repetition+Confidences) than the basic "winner takes it all" voting strategy.

The Multisymbol+Confidences trace illustrates SER obtained using QEFEC where each QEFEC code used all the experimental data points one time only to construct and test codewords in this case, the lowest measurable SER is $>10^{-8}$. The system 100 enables a SER improvement of about 26 dB compared to the QPSK classical shot-noise limit, achieved at 7 photons per bit. The Confidences+Multisymbol (BS) trace illustrates SER obtained using the same QEFEC codes but SER is estimated from the experimental data by random drawing until at least 3 errors occur (labeled as BS for data bootstrapping). The best SER improvement is about 40 dB below the QPSK classical shot-noise limit, achieved at 11 photons per bit. Dashed lines are guides for the eye. Error bars represent one standard deviation calculated as a square root of the number of observed errors.

The system 100 provides the benefit of quantum measurement advantage by producing CAPPs that can be supplemented to error correction codes for soft decoding. For example, a set of error correction codes using CAPPs and providing improved performance is identified. By building codewords carrying multiple information symbols supplemented with auxiliary symbols. Auxiliary symbols include the result of logical operations, such as bitwise inversion and bitwise XOR, applied to information symbols. Bit values can be assigned in various ways to each of the alphabet states. Other auxiliary symbols used are "physically" distant states (for QPSK, these are states shifted by phase $\pi$ from the information symbols). An example of the advanced error correction code may use three information and nine auxiliary symbols (FIG. 8).

Figure 8:
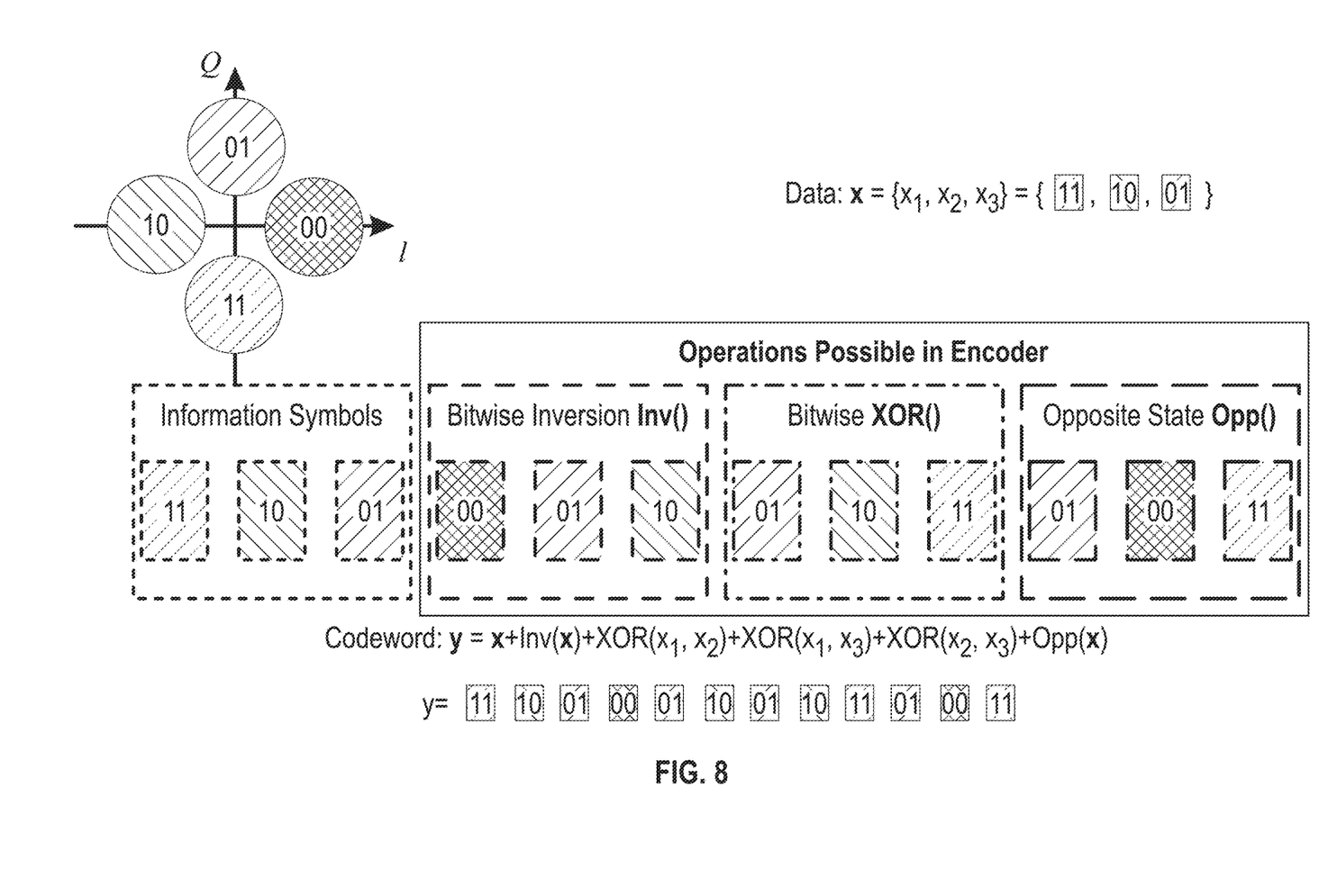
FIG. 8 is a graph illustrating an exemplary multi-symbol error code containing three information symbols and nine auxiliary symbols, in accordance with examples of the present disclosure.

Referring to FIG. 8, an example of a multi-symbol quantum forward error correction code with three information symbols using a QPSK alphabet is shown. In this example, for QPSK modulation, each information signal can be in one of the 4 coherent states with phase shifted by $\pi/2$, which corresponds to the total number of valid codewords $4^3 = 64$. To find the energy efficiency of the FEC, notice that each codeword contains $3 \log_2 4 = 6$ bits of information and consists of: 3+9=12 symbols. For example, each symbol corresponds to a coherent optical state with an average energy of 2 photons (1 photon per bit), and therefore the optical power at the receiver remains constant for all the error correction codes considered. However, auxiliary symbols in the codeword are derived from the information symbols and therefore they are redundant and do not add to the number of bits of transmitted information. Thus, codewords in the example consist of 12 symbols, where each symbol is a coherent optical pulse with 2 photons on average, and the codewords contain 6 bits of information. Therefore, a reduction in the error rate does not come for free with the FEC: the energy consumption of the corresponding QEFEC is about 4 photons/bit (12 symbols×2 photons/symbol/6 bits=4 photons/bit), 4 times greater than the raw experimental energy consumption for a single symbol.

Figure 9:
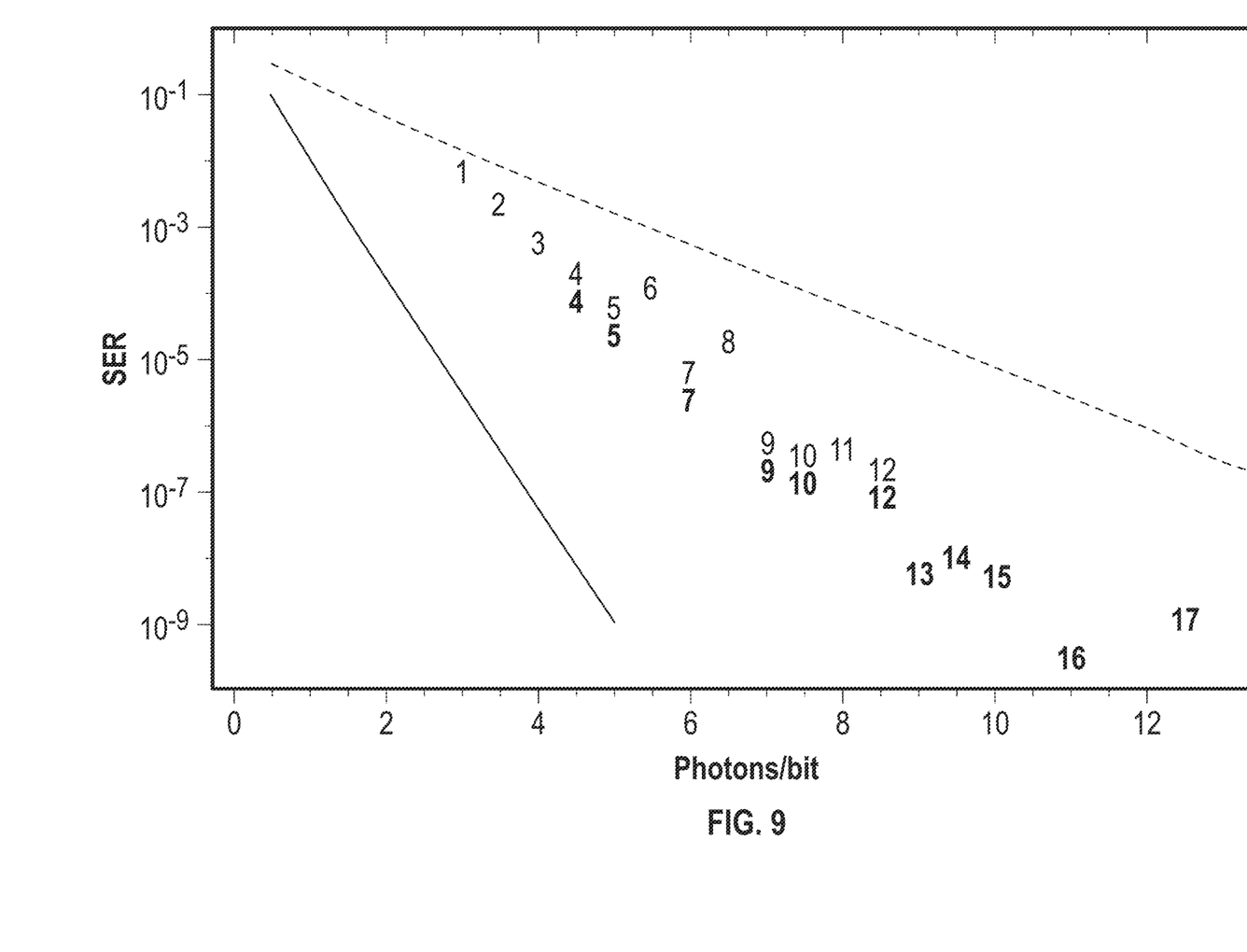
FIG. 9 is a graph illustrating SER vs. photons per bit for the system of FIG. 1, in accordance with examples of the present disclosure.

FEC codewords are tested that can be built by adding auxiliary symbols to the information symbols. Auxiliary symbols can be created by repeating and/or combining different bitwise and/or opposite state operations. The quantum receiver measures and returns the set of CAPPs for each symbol of the received codeword. Then QEFEC algorithm calculates cumulative confidences for each possible codeword by multiplying experimentally obtained CAPPs corresponding to the codewords' symbols. The codeword with the highest confidence is considered a correct message. Each decoded information symbol is compared with the corresponding transmitted information symbol to estimate the SER. As the codewords' length is increased, the SER rapidly decreases (FIGS. 7 and 9). When the experimental data is used only once to evaluate error correction performance (Multisymbol+Confidences trace), a 26 dB improvement over the QPSK classical limit is obtained when using QEFEC with 7 photons per bit. The overhead associated with each QEFEC code is accounted for in FIG. 7 as the number of photons per bit used by a code. Note that a further increase in codeword length leads to even higher suppression of errors. The results with zero errors are not shown in the log scale. Indeed, given the number of experimental measurements of about $10^8$, SERs below $10^{-8}$ cannot be estimated if each measurement result is used only once. To assess the expected error rate of longer codewords, experimental data is drawn randomly and allows the use of the same points multiple times; this technique is known as bootstrapping. For this calculation, that the algorithm must find at least three errors and calculates SER by dividing the number of errors by the number of received data symbols (Confidences+Multisymbol (BS) trace). In comparing a raw SER estimate with the bootstrapping-assisted estimate, SERs are obtained that are similar (to within the uncertainty range); thus, error estimation is not affected by the method used. The best result is about 84 dB below the initial raw experimental SER, and only 3 errors per 10 billion information symbols of user data were obtained (see Multisymbol+Confidences (BS) trace in FIGS. 7, 9, and 10 for the list and description of tested error correction codes). In comparing the results with fundamental bounds, the results for the system 100 compare favorably to a PNR quantum receiver for mesoscopic states of light, and the best results are about 40 dB lower than the classical homodyne limit for the input states of the same energy. Additionally, no signs of SER saturation were observed with the total optical energy per bit, a typical behavior in quantum receivers. Thus, the system 100 solves the technical problem for communication systems use of classical receivers which have a homodyne limit for the input states of the same energy. This technical problem is solved by leveraging a quantum enabled receiver that includes the beam splitter, the optical LO, and the SPD as described above.

The disclosed systems and methods provide the advantages of taking the extra information available in a quantum measurement (single-shot accuracy estimates given by CAPPs) and practically using them to reduce the physical resource (input energy) requirements for reliable communications using any encoding modulation. The system also provides the benefit of supplementing capacity-achieving error correction codes such as turbo codes, with CAPPs.

Referring to FIG. 10, a table is shown that lists and describes exemplary error correction codes that can be used with the system of FIG. 1. "#" corresponds to the numbers shown in FIG. 9. Capital letters "A", "B", etc., correspond to information symbol of a codeword. In the case of QPSK each of these symbols may be one of the four coherent states $\{|\alpha\rangle, |-\alpha\rangle, |-\alpha\rangle, |-i\alpha\rangle\}$. Auxiliary symbols are generated from information symbols using repetition, $\bar{x}$—bitwise inversion, $\bar{\bar{x}}$—physically opposite states (for QPSK these are the states with a phase difference of $\pi$) X⊕Y—bitwise XOR, and combinations of these operations.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For example, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the drawings.

The phrases "in an aspect," "in aspects," "in various aspects," "in some aspects," or "in other aspects" may each refer to one or more of the same or different example aspects provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawings are presented only to demonstrate certain examples of the present disclosure. Other elements, steps, methods, and techniques that are insubstantially different from those described above and/or in the appended claims are also intended to be within the scope of the present disclosure.

What is claimed is:

1. A system for quantum-enabled error correction, the system comprising:
   a receiver configured to obtain an optical signal, the optical signal including encoded information, wherein the encoded information includes one or more communication alphabet symbols, the receiver including:
   a beam splitter;
   an optical local oscillator (LO) configured to produce destructive interference with the optical signal at the beam splitter;
   a single photon detector (SPD) configured to detect photons from an output of the beam splitter;
   a processor; and
   a memory, including instructions stored thereon, which, when executed by the processor, cause the system to:
   detect by the SPD one or more photons;
   determine a set of a posteriori Bayesian probability values based on a period of time of a previous state of the LO and based upon the one or more photons detected by the SPD;
   update the optical LO from the previous state to the next state based on the highest a posteriori Bayesian probability, wherein the next state of the optical LO is a new input state having a highest probability value that the next state matches the state of the optical signal; and determine a likelihood of each of the one or more communication alphabet symbols being correct based on the set of a posteriori Bayesian probability values.

2. The system of claim 1, wherein the instructions, when executed by the processor, further cause the system to:
perform error correction based on the determined likelihood of each of the one or more communication alphabet symbols being correct.

3. The system of claim 1, further comprising a transmitter configured to transmit the optical signal, wherein the transmitter includes a laser source and a modulator.

4. The system of claim 1, wherein the instructions, when executed further cause the system to:
identify a quantum state based on displacement of the optical signal.

5. The system of claim 1, wherein the instructions, when executed further cause the system to:
determine a photon detection time for each of the one or more photons that are detected by the SPD.

6. The system of claim 5, wherein determining the likelihood of each communication alphabet symbol being correct is further based on at least one of previously applied optical LO states or the photon detection time for each of the one or more photons that are detected by the SPD.

7. The system of claim 1, wherein a state of the optical LO is only changed from the previous state to the next state when the one or more photons are detected by the SPD.

8. The system of claim 1, wherein each of some of the possible states of the optical LO are tested for an arbitrary time independent of a number of photons detected by the SPD.

9. The system of claim 1, wherein the instructions, when executed by the processor, further cause the system to:
identify only a state of the optical signal at the input of the receiver with a highest probability as a state identification outcome for that input state based on the determined likelihood of each of the one or more communication alphabet symbols being correct.

10. A method for quantum-enabled error correction, the method comprising:
receiving, by a receiver configured to receive optical signals, an optical signal including encoded information, wherein the encoded information includes one or more communication alphabet symbols, the receiver including:
a beam splitter;
an optical local oscillator (LO) configured to produce destructive interference with the optical signal at the beam splitter;
a single photon detector (SPD) configured to detect photons from an output of the beam splitter;
detecting one or more photons by the SPD;
determining a set of a posteriori Bayesian probability values based on a period of time of a previous state of the LO and based upon the one or more photons detected by the SPD;
updating the optical LO from the previous state to a next state based on the highest a posteriori Bayesian probability, wherein the next state of the optical LO is a new input state having a highest probability value that the next state matches the state of the optical signal; and
determining a likelihood of each of the one or more communication alphabet symbols being correct based on the set of a posteriori Bayesian probability values.

11. The method of claim 10, further comprising transmitting the optical signal by a laser source and a modulator.

12. The method of claim 10, further comprising identifying a quantum state based on displacement of the optical signal.

13. The method of claim 10, further comprising determining a photon detection time for each of the one or more photons that are detected by the SPD.

14. The method of claim 13, wherein determining the likelihood of each communication alphabet symbol being correct is further based on at least one of previously applied optical LO states or the photon detection time for each of the one or more photons that are detected by the SPD.

15. The method of claim 10, wherein a state of the optical LO is only changed from the previous state to the next state when the one or more photons are detected by the SPD.

16. The method of claim 10, further comprising performing error correction based on the determined likelihood of each of the one or more communication alphabet symbols being correct.

17. The system of claim 10, wherein each of some of the possible states of the optical LO are tested for an arbitrary time independent of a number of photons detected by the SPD.

18. The method of claim 10, wherein the optical signal, received by the receiver, has an input state at a point in time, and
wherein the method further comprises identifying only the input state with a highest probability as a state identification outcome for that input state based on the determined likelihood of each of the one or more communication alphabet symbols being correct.

19. A system for quantum-enabled error correction, the system comprising:
a receiver configured to receive an optical signal and detect photons, the optical signal including encoded information, wherein the encoded information includes one or more communication alphabet symbols, wherein the receiver includes:
a processor; and
a memory, including instructions stored thereon, which, when executed by the processor, cause the system to:
detect one or more photons by the receiver wherein the optical signal, received by the receiver, has an input state at a point in time;
determine a set of a posteriori Bayesian probability values based on modulating an optical local oscillator (LO) of the receiver for a period of time where a state of the optical LO matches a state of the optical signal; and
determine a likelihood of each of the one or more communication alphabet symbols being correct based on the set of a posteriori Bayesian probability values.

20. The system of claim 19, wherein the instructions, when executed by the processor, further cause the system to:
perform error correction based on the determined likelihood of each of the one or more communication alphabet symbols being correct.

* * * * *